(12) United States Patent
Fields (10) Patent No.: US 8,677,549 B2
(45) Date of Patent: Mar. 25, 2014

(54) CLEANING IMPLEMENT

(76) Inventor: Blaine Alan Fields, Santa Monica, CA (US)

( * ) Notice: Subject to any disclaimer, the term of this patent is extended or adjusted under 35 U.S.C. 154(b) by 468 days.

(21) Appl. No.: 13/012,370

(22) Filed: Jan. 24, 2011

(65) Prior Publication Data

US 2012/0024723 A1 Feb. 2, 2012

Related U.S. Application Data

(60) Provisional application No. 61/336,526, filed on Jan. 22, 2010.

(51) Int. Cl.
*A47L 1/06* (2006.01)
*B65D 81/00* (2006.01)

(52) U.S. Cl.
USPC .............................. 15/245; 206/207

(58) Field of Classification Search
USPC ..................... 15/245; 206/205, 207
See application file for complete search history.

(56) References Cited

U.S. PATENT DOCUMENTS

| | | | |
|---|---|---|---|
| 57,656 | A | 9/1866 | Alden |
| 3,724,017 | A | 4/1973 | Mallory |
| 4,143,792 | A | 3/1979 | Rex |
| 4,312,093 | A | 1/1982 | Raab |
| 4,759,470 | A | 7/1988 | Jacobs |
| 4,903,869 | A | 2/1990 | McKenna |
| 5,709,005 | A * | 1/1998 | Brach et al. ................... 15/145 |
| 6,007,129 | A | 12/1999 | Kearney, Jr. |
| 6,036,388 | A | 3/2000 | Atcher |
| 6,135,276 | A | 10/2000 | French et al. |
| 6,227,737 | B1 | 5/2001 | Lightfoot |
| 6,301,740 | B1 | 10/2001 | Quiroz |
| 6,360,884 | B1 | 3/2002 | Smith et al. |
| 6,758,331 | B2 | 7/2004 | DeHart |
| 6,854,910 | B2 | 2/2005 | Leblanc |
| 7,311,458 | B2 | 12/2007 | Verlin |
| 7,594,294 | B2 * | 9/2009 | Billig et al. ................... 15/121 |
| 7,617,560 | B2 | 11/2009 | Argo et al. |
| 7,766,258 | B2 | 8/2010 | Barniak, Jr. |
| 2005/0005949 | A1 | 1/2005 | Boggess |
| 2006/0029458 | A1 | 2/2006 | Jones |
| 2006/0115316 | A1 | 6/2006 | Verlin |
| 2009/0185851 | A1 | 7/2009 | Mapalo et al. |

FOREIGN PATENT DOCUMENTS

GB 917564 2/1963

* cited by examiner

*Primary Examiner* — Randall Chin
(74) *Attorney, Agent, or Firm* — Heidi Eisenhut; Loza & Loza (57) ABSTRACT

A squeegee device having an integrated scraper blade, which includes a removable and telescoping/extendable handle pivotably connected to a squeegee head for motion of the device between squeegee position, wherein the handle is generally orthogonal to the head for facilitating cleaning windshields and windows, and a storage configuration, wherein the handle and head are generally parallel and the head can be disposed and sealed entirely within a portable container which includes an integrated reservoir which holds a supply of aqueous cleaning solution. The device can be used in conjunction with instant glass cleaner tablets which dissolve in plain water within the integrated reservoir to make an aqueous cleaning solution, and includes an integrated removable tray which stores a supply of cleaner tablets within the container. The device also features an integrated shield which serves to protect the user's hand and arm from becoming wet/soiled from aqueous solution and/or debris which might otherwise run unimpeded down the handle or fall from the squeegee head while the squeegee is being carried and/or used.

15 Claims, 9 Drawing Sheets

CLEANING IMPLEMENT

RELATED APPLICATION

The present application claims priority to U.S. provisional patent application No. 61/336,526, filed on 22 Jan. 2010; all of the foregoing patent-related document(s) are hereby incorporated by reference herein in their respective entirety(ies).

BACKGROUND OF THE INVENTION

1. Field of the Invention

The present invention relates to portable window cleaning stations and more particularly to portable window cleaning stations for motor vehicles and more particularly for portable windshield cleaning stations for family and personal size automobiles.

2. Description of the Related Art

Squeegee, squilgee, or sometimes squimjim, is a known tool with a smooth rubber (or similar material) blade, used to remove or control the flow of liquid on a flat surface. Rubber and rubber-like materials will herein collectively be referred to as "rubber." It is used for cleaning, such as the cleaning of motor vehicle windshields and windows. For purposes of this document, a windshield will be considered as one sort of motor vehicle window, and even a windshield on a motorcycle will be considered as a motor vehicle "window" despite the fact that the motorcycle is not enclosed. From time to time, squeegees are used by consumers because it is necessary to periodically clean windows, and, in the case of a vehicle, to clean the windshield and other vehicle windows.

One known type of squeegee is shown in U.S. Pat. No. 7,617,560 ("Argo"). Reference numbers used in this discussion of Argo relate to the Argo reference and not to the drawings of this document. The Argo squeegee includes telescoping handle 102, 110, a squeegee head and a hinged joint 104. As shown in FIGS. 1A and 1B of Argo, because the handle telescopes, and further because the squeegee head is pivotally supported by the hinged joint, the Argo squeegee can be collapsed into a relatively small space when not in use. Argo does not disclose an integrated scraper blade at one end of the squeegee.

Many service stations are equipped with squeegee stations, a squeegee station being comprised of a squeegee with both a rubber blade and a reservoir of cleaning solution, for cleaning vehicle windshields and windows. While effective in cleaning windshields and other windows, squeegee stations are not made available by every service station. Where they are provided, the squeegee equipment is sometimes in disrepair and/or the cleaning solution is of insufficient volume and/or excessively dirty, making the cleaning of the window surfaces ineffective or less efficient. Also, more than one motorist wants to use the squeegee at the same time causing traffic congestion at the fuel pumps.

As will be discussed below, portable, personal squeegee stations have been made, presumably to help address some of these problems. However, these have failed to catch on in a major way with the motoring public. For example, a squeegee can be transported in a vehicle with a spray bottle of cleaning solution to be used in conjunction with a squeegee. This can be considered as a portable squeegee station on some sense and will herein be called a "spray bottle squeegee station." A spray bottle squeegee station has certain drawbacks. One drawback is that applying the cleaning solution using a spray bottle requires much more time and energy, and is less efficient and comprehensive than using a dunked squeegee (that includes a sponge) to get cleaning fluid onto the window and also to remove soiled cleaning solution from the window and window frame. Another drawback is that a squeegee is most effective when it is dunk-cleaned intermittently during the window cleaning process, so that the sponge and/or rubber blade can remain as clean as the cleaning solution in the reservoir will permit.

Another potential type of portable squeegee station might be made by simply removing a squeegee station from its fixture at the service station and putting that in the motor vehicle. However, this is not a workable solution. Pre-existing squeegee stations of the type found in service stations should not be stored in a vehicle immediately after use because they will not generally stand on a flat horizontal surface and further because (even if these stations could stand flat) cleaning fluid is bound to get all over the place due to spillage off of the squeegee or out of the reservoir as the vehicle is subject to mechanical shocks that occur during normal operation of a motor vehicle.

In the case of using an existing squeegee in conjunction with a bucket or other reservoir of cleaning solution in order to clean the windows, mirrors, and other glass surfaces at a fixed structure such as a house, both the reservoir and the squeegee, either separately or together, can be cumbersome to transport from one location to another, and, additionally, there is the risk of spilling or dripping the aqueous cleaning solution onto flooring or other surfaces, which is undesirable, particularly when indoors. For these reasons it may be perceived as being not convenient to prepare and transport a reservoir of aqueous cleaning solution each time one desires to clean glass surfaces, especially if one wishes to clean only one or two windows/glass surfaces within the house or other structure. Although this idea that one does not want to carry a big bucket of fluid around for a small (but frequently occurring) cleaning, such as cleaning the windshield, it is believed that most people have an alternative understanding of the logistics on this point and that is why people don't squeegee their car windows at home with a bucket, but instead opt for somewhat inferior window cleaning methods, such as spray bottle and cloth.

U.S. Pat. No. 6,854,910 ("Leblanc") discloses a portable squeegee station. All Fig. numbers and reference numerals used in this discussion of Leblanc refer to LeBlanc and not this document. the Leblanc station includes a squeegee 30 and a cleaning fluid reservoir chamber (or "housing") 20. As shown in FIGS. 2 and 3 of Leblanc, the handle of the squeegee telescopes in order to allow it to fit within the interior space of the housing. As shown in FIGS. 1 and 3 of Leblanc, the housing includes a pivoting lid 25 which can be closed to prevent escape of the cleaning fluid L from the stowed squeegee and/or reservoir of fluid. Leblanc discloses that its portable squeegee station is sufficiently small and light to be carried in a vehicle on a regular basis during ordinary driving.

U.S. Pat. No. 6,758,331 ("DeHart") discloses a truck windshield washing station. All Fig. numbers and reference numerals used in this discussion of DeHart refer to DeHart and not this document. It is not clear whether this station is sufficiently small and light to be feasibly transported on a regular basis in a passenger vehicle. The station of DeHart includes a full size squeegee and a chamber that can hold both cleaning fluid and the squeegee (when not in use). As shown in FIG. 5 of DeHart, the reservoir chamber of Dehart includes a pivoting lid to hold the fluid in, similar to the pivoting lid discussed above in connection with Leblanc.

U.S. Pat. No. 7,311,458 ("Verlin") discloses a portable squeegee station. All claim numbers, Fig. numbers and reference numerals used in this discussion of Verlin refer to Verlin and not this document. The Verlin station includes container 16 and a squeegee (including a handle 12, 34 and lid 18). The Verlin squeegee has two detachably attachable components. One component is made up of the squeegee head, a first segment of the handle and the lid. This component is structured such that the first handle segment extends from the center of the underside of the lid at a first end to a pivoting mechanical connection with the squeegee head at its second end. The other component of the Verlin squeegee, called detachable portion 34, is a second segment of the handle. When the Verlin station is in the stored configuration (see FIG. 3) the lid seals cleaning fluid inside the interior space of the container. Verlin discloses that the lid may be detachably attached to the container by a compression fit or by threaded engagement. In the storage configuration (i) the head of the squeegee is pivoted so that the central axis of the squeegee head and the central axis of the squeegee handle at least substantially coincide; (ii) the squeegee head and first handle segment hang down from the underside of the lid into the interior space of the container and the cleaning fluid that it contains; (iii) the extension segment is detached from its threaded engagement with the lid; (iv) the extension segment resides in a recess provided in the outer surface of the container. In the cleaning configuration: (i) the lid is detached from the container; (ii) the component of the squeegee including the lid and squeegee head is pulled away from the container so that the squeegee head is removed from the interior space of the container; (iii) the squeegee head is pivoted to be perpendicular to the first handle segment; (iv) the second handle segment is screwed into threaded engagement with a threaded hole in the top surface of the lid to form a squeegee with a relatively long handle that has a lid interposed in the handle.

It is believed that there are certain disadvantages to the Verlin design including the following: (i) lid subject to accidental removal (potentially resulting in cleaning fluid spillage) especially when station is regularly transported in a motor vehicle where it is subject to mechanical shocks and vibration; (ii) design requires a guide wall 22 with apertures 24 (see claims 1 and 8) making the interior space of the container difficult to clean; (iii) design requires a guide wall 22 with apertures 24 making the station subject to failure of this upstanding, unsupported guide wall; (iv) detachable portion 34 is secured to the container by a tether which potentially could interfere with other objects when the station is moved, and can also complicate unscrewing of the lid 18 from container 16 and can complicate the screwing of the lid and detachable portion to each other; (v) because the squeegee head must pivot so that its central axis coincides with that of the first handle segment the squeegee is difficult to manufacture; and (vi) because the squeegee head must pivot so that its central axis coincides with that of the first handle segment the squeegee is subject to failure.

The following published documents may also include helpful background information: (i) U.S. Pat. No. 6,036,388 ("Atcher"); (ii) U.S. Pat. No. 4,143,792 ("Rex"); (iii) U.S. Pat. No. 4,759,470 ("Jacobs"); (iv) US patent application 2006/0115316 ("Verlin 2"); (v) U.S. Pat. No. 7,766,258 ("Barniak, Jr."); (vi) U.S. Pat. No. 6,360,884 ("Smith"); (vii) U.S. Pat. No. 6,007,129 ("Kearney, Jr."); (viii) U.S. Pat. No. 6,135,276 ("French"); (ix) US Patent Publication No. 2005/0005949("Boggess"); (x) US Patent Publication No. 2009/0185851 ("Mapalo"); (xi) U.S. Pat. No. 4,312,093 ("Raab"); (xii) U.S. Design Pat. No. 57,656 ("Alden"); (xiii) U.S. Pat. No. 3,724,017 ("Mallory"); (xiv) Great Britain Patent Document No. 917,564 ("Spaker"); (xv) U.S. Pat. No. 6,227,737 ("Lightfoot"); (xvi) US Patent Publication No. 2006/0029458 ("Jones"); (xvii) U.S. Pat. No. 6,301,740 ("Quiroz"); and (xviii) U.S. Pat. No. 4,903,869 ("McKenna"). Some additional background information is that there is an unpublished U.S. patent application Ser. No. 08/665,666 ("Portable Window Cleaning Device For Vehicle"), now abandoned, that was made by the present inventor.

Description of the Related Art Section Disclaimer: To the extent that specific publications and/or unpublished background information are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time, may not have been sufficiently published to qualify as prior art, and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

The inventor of the present invention has recognized a couple of potential problems with squeegees which may not have been recognized before (or at least not been recognized as technologically addressable problems). One of these potential problems is that many known squeegee sponges are covered by netting. Also, the sponge with scrub netting incorporated into squeegees such as the type found at gas stations are not ideal for loosening particularly stubborn debris, such as hardened bird droppings, tree sap, and tar. The scrub sponge must be maneuvered back and forth over such debris spots for an inordinately long time and with much downward force before the debris is loosened sufficiently, so that the debris can then be removed from the glass surface with the squeegee blade. Not only is the sponge and scrub netting not efficient for removing such debris, but the sponge and scrub netting also wear out much faster than it would if it weren't used to remove stubborn debris. Further, once the sponge and/or scrub netting is worn out and/or damaged, the entire squeegee is usually discarded.

Another potential problem is that when traditional squeegees such as those found at gas stations are carried or used in an orientation where the squeegee sponge which has been soaked in aqueous solution is higher in elevation than the handle, soiled aqueous solution can undesirably flow down the handle, sometimes reaching the users hand. As well, aqueous solution and/or debris can fall from the head directly onto the users hand and/or arm.

One aspect of the present invention is directed to a portable squeegee station that includes a squeegee and a container for cleaning fluid. The squeegee has a pivoting head. The container has a top opening and an interior space. The interior spaces lies within the vertical footprint of the top opening, so there is no substantial overhang upon which the pivoting squeegee head can catch.

Another aspect of the present invention is directed to a portable squeegee station where a handle segment of the squeegee can help secure the lid to the cleaning fluid container when the station is in a storage configuration. Preferably, in the storage configuration, the handle is secure and accessible enough so that a user can use it as a handle to carry, or help carry, the container.

According to an aspect of the present invention, a portable squeegee station includes: a squeegee; a container (that is shaped to define a vertical direction, a top end and a bottom end); and a lid. The squeegee includes a first handle segment, an elongated rubber blade and connection hardware. The pivoting connection hardware rotationally mechanically connects the elongated rubber blade to the first handle segment so that the elongated rubber blade and the first handle segment can rotate relative to each other between: (i) a cleaning position where the head frame is at least substantially perpendicular to the handle, and (ii) a storage position where the rubber blade is not substantially parallel to the first handle segment. The rubber blade is shaped and/or sized to be suitable for use in cleaning motor vehicle windows. The container comprises a base at its bottom end, with the base being sized and shaped to support the container in an upright and steady manner when the container is placed on a level surface. The container further defines a top opening at its top end and an interior space accessible through the top opening. The top opening and lid are sized, shaped and/or structured so that the lid is detachably attachable from the top opening and forms a fluid tight seal therewith when attached. The squeegee and top opening are sized and/or shaped so that: (i) the squeegee can be inserted completely into the interior space of the container through the top opening when in its storage position; but (ii) the squeegee cannot be completely inserted through the top opening into the interior space of the container when in its cleaning position. The container is sized and/or shaped so that the interior space at least substantially lies in the vertical footprint of the top opening. The container is sized and/or shaped to be portable when filled with cleaning fluid and covered by the lid.

According to a further aspect of the present invention, a portable squeegee station includes: a squeegee head segment; a squeegee handle segment; a container (that defines an opening and an interior space that is accessible through the opening); and a lid. The squeegee head segment comprises a squeegee head frame, an elongated rubber blade and a handle connection hardware set. The rubber blade is shaped and/or sized to be suitable for use in cleaning motor vehicle windows. The top opening and lid are sized, shaped and/or structured so that the lid is detachably attachable from the top opening. The handle segment and handle connection hardware set are sized, shaped, located and/or structured so that the handle segment is detachably attachable from the handle connection hardware set and serves of at least a portion of a handle for the squeegee head segment when it is attached to the handle connection hardware set. The lid includes a handle receiving hardware set. The container includes a handle receiving hardware set. The lid, the container and the squeegee handle segment are sized, shaped and/or structured so that: the squeegee handle segment is removably engagable with the handle receiving hardware set of the lid and with the handle receiving hardware set of the container when the lid is attached to the top opening of the container, and when engaged with both the handle receiving hardware set of the lid and with the handle receiving hardware set of the container, the handle segment helps secure the attachment between the lid and the top opening. The container is sized an shaped to be portable when filled with cleaning fluid and covered by the lid.

According to a further aspect of the present invention, a portable squeegee station includes: a container (defining a vertical direction, a top end, a bottom end, a threaded top opening and an interior space accessible through the top opening); a lid assembly; and a handle extension segment (defining a threaded end). The container is sized and/or shaped so that the interior space at least substantially lies in the vertical footprint of the top opening the container comprises a base at its bottom end, with the base being sized and shaped to support the container in an up right and steady manner when the container is placed on a level surface. The container further includes a handle receiving hardware set in the form of a threaded hole. The lid assembly includes a squeegee head frame, an elongated rubber blade, a base handle segment, pivoting connection hardware and a lid member. The rubber blade is shaped and/or sized to be suitable for use in cleaning motor vehicle windows. The pivoting connection hardware rotationally mechanically connects the squeegee head frame to the base handle segment so that the head frame and the base handle segment can rotate relative to each other between: (i) a cleaning position where the head frame is at least substantially perpendicular to the handle, and (ii) a storage position where the rubber blade is not substantially parallel to the first handle segment. The lid assembly and top opening are sized and/or shaped so that: (i) the squeegee head frame can be inserted completely into the interior space of the container through the top opening when in its storage position; but (ii) the squeegee head frame cannot be completely inserted through the top opening into the interior space of the container when in its cleaning position. The lid member includes a first set of threads, a second set of threads and a handle extension receiving hardware set in the form of a recess. The lid and the top opening are sized, shaped and/or structured so that the lid, through its first set of threads, is removably threadably engagable with the top opening and forms a substantially fluid tight seal of the interior space of the container when threadably engaged with the top opening. The lid, the container and the handle extension segment are sized, shaped and/or structured so that: the handle extension segment is removably engagable with the handle receiving hardware set of the lid. The threaded end of the handle extension segment is removably threadably with the handle receiving hardware set of the container when the lid is attached to the top opening of the container, and when engaged with both the handle receiving hardware set of the lid and with the handle receiving hardware set of the container, the handle segment helps secure the attachment between the lid and the top opening and provides a handle for carrying the container and lid. The handle extension segment and the lid member are sized, shaped, structured and/or located so that the threaded end of the handle extension segment is removably threadably engagable with the second set of threads of the lid member. The container is sized an shaped to be portable when filled with cleaning fluid and covered by the lid.

BRIEF DESCRIPTION OF THE DRAWINGS

The present invention will be more fully understood and appreciated by reading the following Detailed Description in conjunction with the accompanying drawings, in which.

DETAILED DESCRIPTION OF THE INVENTION

Figure 1:
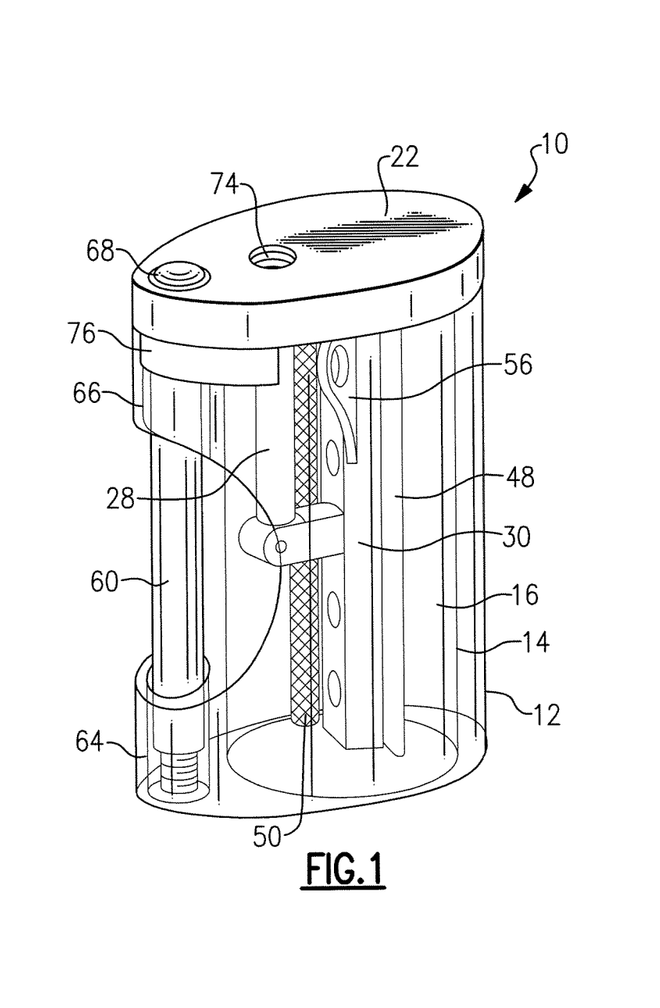
FIG. 1 is a perspective view of a first embodiment of a portable cleaning station according to the present invention.
Figure 2:
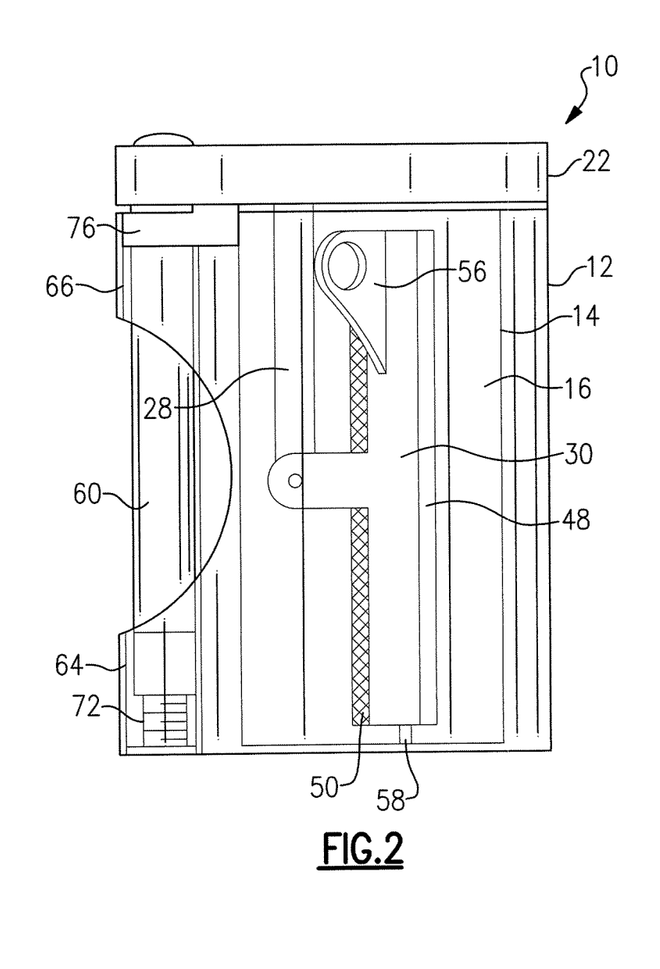
FIG. 2 is a side elevational view of the first embodiment.

A highly preferred embodiment of the invention will now be discussed with reference to FIGS. 1 to 16. Referring initially to FIG. 1 and FIG. 2, a portable windshield cleaning device, generally designated 10 is shown. As shown, the device 10 includes a plastic container 12 which includes a reservoir 14 defining a chamber 16 for holding water and/or other cleaning solution. Container 12 may be made of transparent plastic material, opaque plastic, translucent plastic, solid-colored (opaque) plastic, lightweight material such as aluminum or any other suitable material now known or to be developed in the future. Container 12 is formed with an open end 18, with external threading 20, to which a lid 22 with internal threading 24 is threadably engaged with the container 12 for covering and sealing the open end 18. The lid 22 doubles as a shield to protect the users hand and arm from becoming wet/soiled when the squeegee is in operational configuration. Advantageously, a fill line indicator 26 can appear on the container 12 on either side where the container 12 coincides/meets with the reservoir 14 for indicating a maximum fill level of fluid in the reservoir 14 when the components discussed below are positioned as intended inside the chamber 16.

Figure 13:
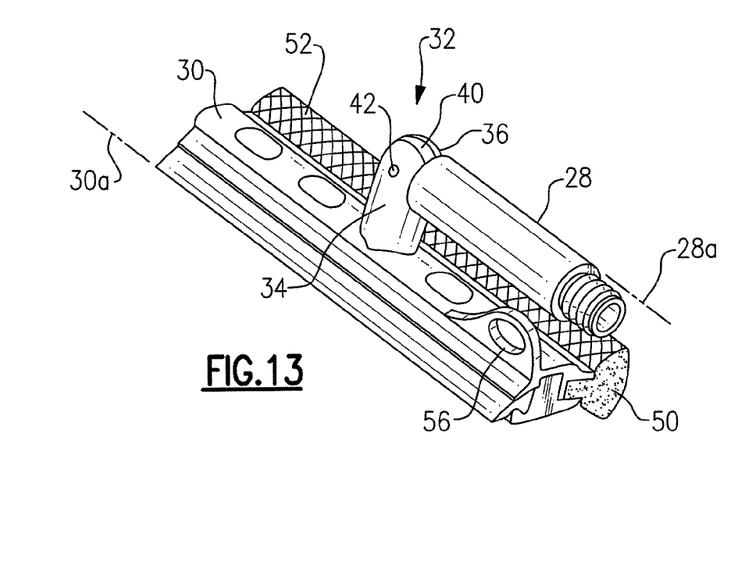
FIG. 13 is another perspective view of a portion of the first embodiment station showing the squeegee head assembly with a pivotably-connected shaft.
Figure 14:
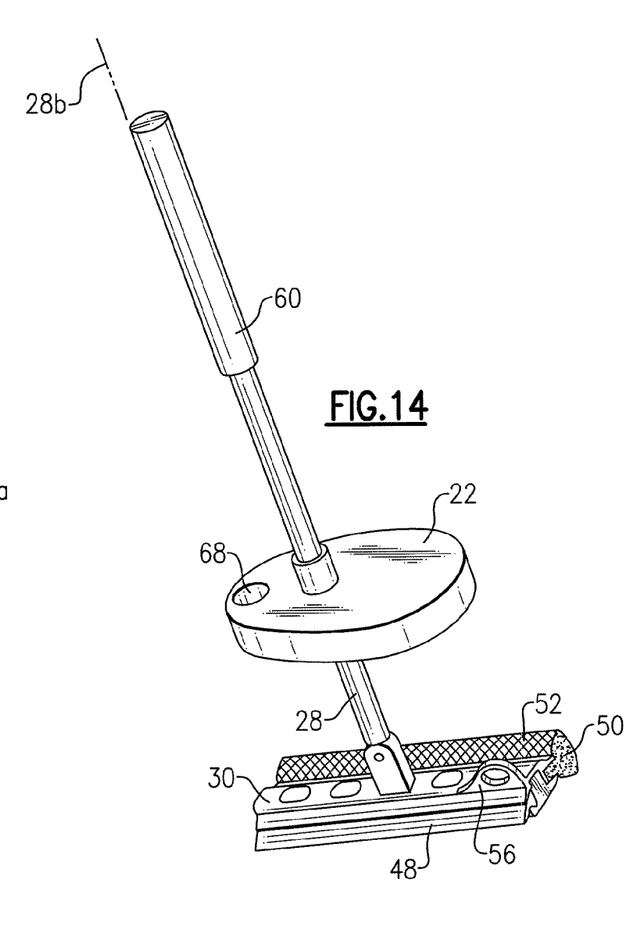
FIG. 14 is a perspective view showing the squeegee in operational configuration, with the telescoping handle attached and extended.

FIG. 1, FIG. 2, and FIG. 13 show shaft 28 being pivotably attached to a squeegee head assembly 30, when in the storage position. As shown in FIG. 1 and FIG. 2, the squeegee head and the shaft are both completely received in the interior space of chamber 16. In the storage position, the long axis 30a of the squeegee head assembly 30 is generally parallel to the long axis 28a of the shaft 28, and the shaft 28 is threadably engaged, in this embodiment, to a shaft receiver sleeve 28c which is internally threaded and which extends from the underside of the lid 22. As shown in FIG. 14, however, the shaft 28 with squeegee head assembly 30, can be removed from the chamber 16 and moved to an operational position, wherein the long axes 28a, 30a are generally orthogonal to each other and wherein the shaft 28 prevents the squeegee head assembly 30 from being advanced into the chamber 16.

Figure 12:
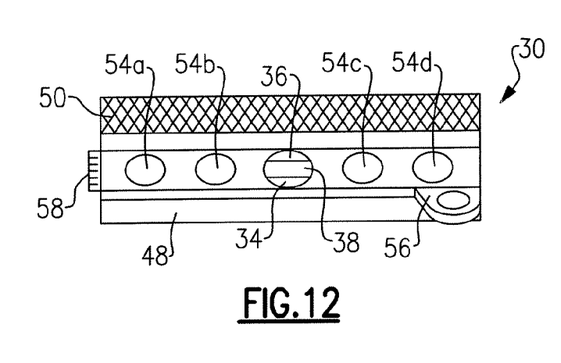
FIG. 12 is a top elevational view of a squeegee head assembly of the first embodiment.

As mentioned above, the shaft 28 is pivotably connected to the squeegee head assembly 30. To this end, and best shown in FIG. 13, a pivot joint, generally designated 32, interconnects the head 30 and the shaft 28 to permit the shaft 28 to be pivoted relative to the head 30. Referring to FIG. 12, in the preferred embodiment shown, the pivot joint 32 includes first and second arms, 34, 36, which are formed integrally with the head 30 and that establish a channel 38 therebetween. A leg 40 is formed on the shaft 28 and is interposed in the channel 38, and a pivot pin 41 extends through the arms 34, 36 and leg 40 to pivotably couple the shaft 28 and head 30. It is to be understood that if desired, the arms of the present pivot joint 32 can be formed on the present shaft with the leg being formed on the present head.

The squeegee head 30 will remain locked (that is, in a relatively secure and stable position until purposefully manipulated) in either the storage position or in the operational position by means of built-in resistance and/or a locking mechanism of some sort, with either locked position being overcome by releasing the locking mechanism and/or overcoming the built-in resistance with the necessary force in order that the head 30 can be maneuvered relative to the shaft 28.

Figure 15:
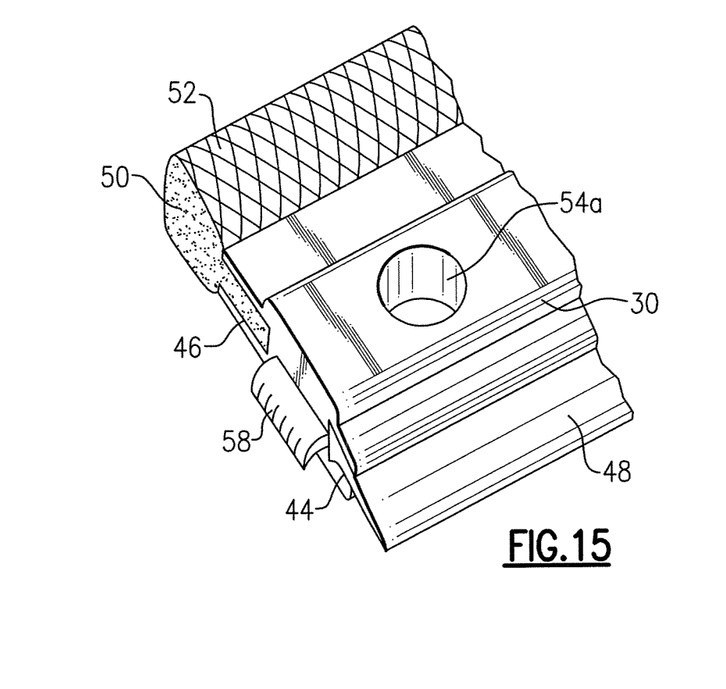
FIG. 15 is a perspective drawing showing an integrated scraper blade of the squeegee.

Referring to FIG. 13 and FIG. 15 as intended by the present invention, the squeegee head assembly 30 includes a squeegee head frame 42 defining opposed first and second channels 44, 46. Also, the squeegee head assembly 30 includes a rubber blade 48 that is held in the first channel 44, and a sponge portion 50 that is covered by an abrasive cloth layer 52 and that is held in the second channel 46 in accordance with principles well-know in the art concerning conventional squeegee heads which feature a rubber squeegee blade and scrub sponge. It may be that squeegee head assembly is designed so that the rubber blade 48 and the sponge 50 with abrasive cloth 52 may be replaceable.

As best seen in FIG. 12, the squeegee head frame 42 is molded so that there is a series of cut-out sections 54a, 54b, 54c, and 54d running from the top side of the squeegee head frame 42 through to the lower side of the squeegee head frame 42. These cut-out sections 54a, 54b, 54c, and 54d serve to keep the reservoir size at a minimum, which is desirable for storage purposes, by increasing the maximum volume of aqueous cleaning solution through decreasing the amount of liquid displaced when the squeegee head assembly 30 is in storage position within the chamber 16. Additionally, the cut-out sections 54a, 54b, 54c, and 54d reduce the total weight of the squeegee head assembly, which is desirable, especially when the squeegee is in operation. While the design in this embodiment depicts the "skeletal" head frame realized with cut-out sections appearing as a series of circles, in an alternative embodiment, the skeletal look and function of the head frame may be carried out in another fashion, with the cut-out sections taking on shapes or forms other than circles.

Integrated into the squeegee head frame 42 is a pull ring 56, best viewed in FIG. 13. This pull ring is not necessarily a preferred feature, but it can be helpful in some embodiments. When the user wishes to move the squeegee head 30 from operational position where long axes 28a and 30a are generally orthogonal to each other, into the storage position where long axes 28a and 30a are generally parallel to each other, the user can insert a finger through the pull ring 56, and pull the squeegee head 30 into storage position. In an alternative embodiment, the squeegee head frame may be spring-loaded so that it can be rotated from storage configuration to operational configuration, and/or from operational configuration back to the storage configuration, via some trigger action, such as the pushing of a button.

Figure 16:
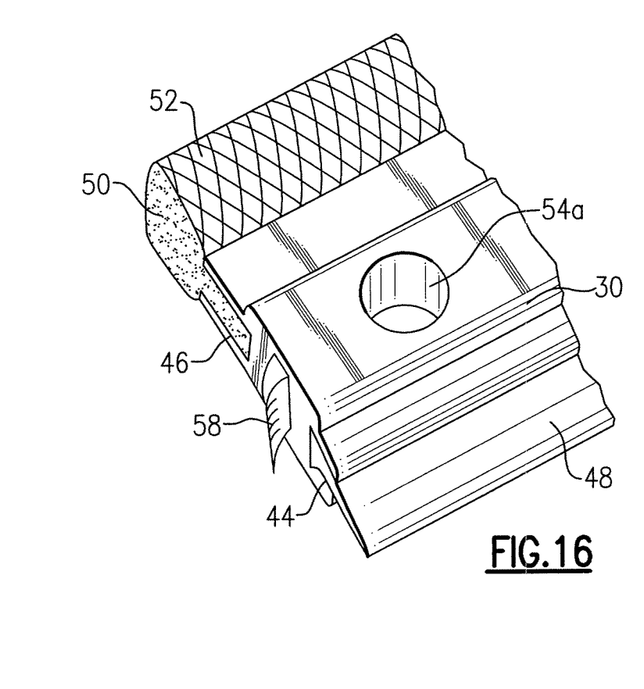
FIG. 16 is a perspective drawing showing an alternative embodiment of the integrated scraper blade.

Referring to FIG. 2, FIG. 12 and FIG. 15, the squeegee head frame 42 also includes an integrated scraper blade 58, molded in conjunction with the squeegee head frame 42. In this preferred embodiment, the scraper blade 58 is fixed in position at the short axis 58a, at a 90 degree angle to the long axis 30a of the squeegee head frame 42. When in operational position, the user can turn the squeegee head assembly 30 on end, so that the long axis 30a is generally perpendicular to the glass/windshield surface, such that the scraper blade 58 can be effectively used to remove particularly stubborn debris deposits from the glass/windshield surface. In an alternative embodiment, as depicted in FIG. 16, it may be that the scraper blade is positioned at the short axis 58a, only generally orthogonal in relation to the long axis 30a.

Referring to FIG. 1 and FIG. 2, FIG. 3 and FIG. 14, the device 10 includes a removable telescoping handle 60, which can be mated to the lid 22 so that, when in operational position, the overall reach of the squeegee is increased by the length of the telescopic handle 60 when in the fully-extended position, as depicted in FIG. 14. The telescoping handle 60 can be made from plastic, aluminum, or other lightweight material(s) in accordance with means well-known in the art of telescoping handles. In an alternative embodiment, the telescoping handle can be spring-loaded to ease in the extending of it into the fully-extended position. In any case, the handle will be able to be locked in either the non-extended position, such as when the handle is in storage configuration, or the fully-extended operational position. It may be that the handle can be locked at any length between fully closed and fully executed.

Figure 9:
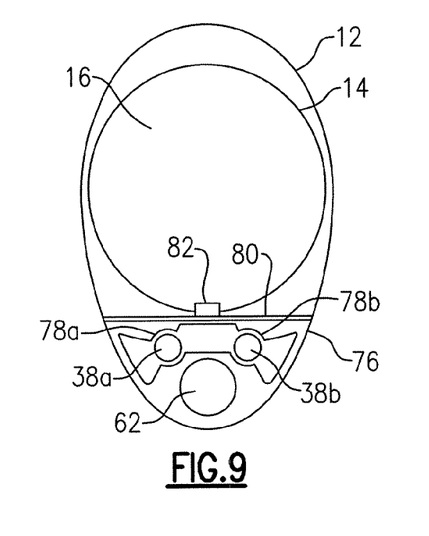
FIG. 9 is another top elevational view of the first embodiment.

As depicted in FIG. 1, FIG. 2 and FIG. 9, the container 12 includes an integrated handle storage area, generally designated 62 comprised of three storage channel sections; the lower section storage channel 64, the upper section storage channel 66, and the lid-section handle storage channel 68, for storing the telescoping handle 60.

Figure 3:
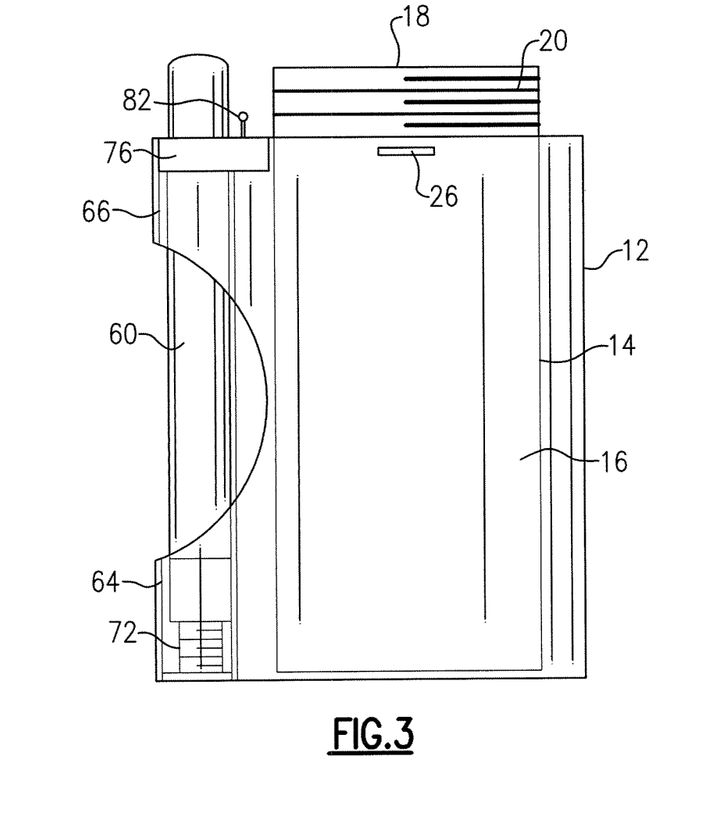
FIG. 3 is another side elevational view of the first embodiment.
Figure 4:
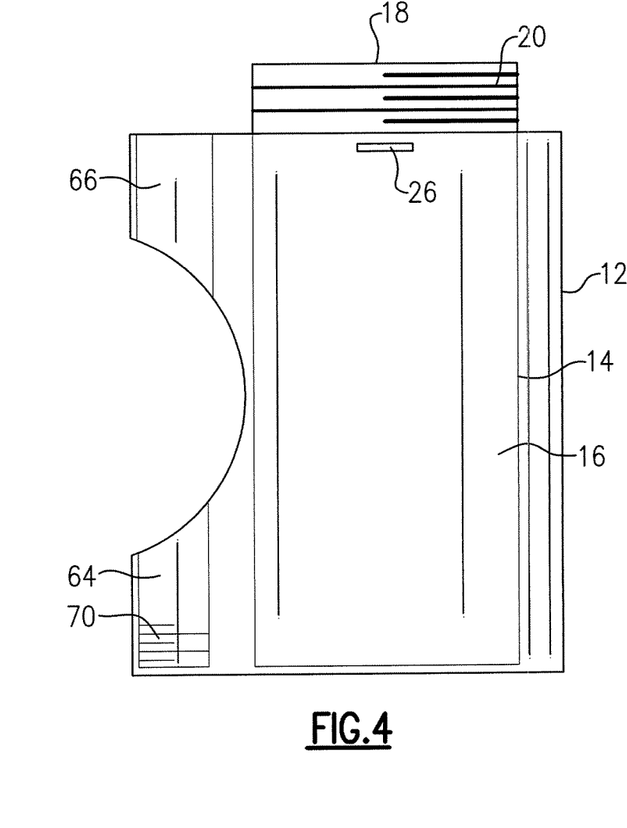
FIG. 4 is another side elevational view of the first embodiment.
Figure 5:
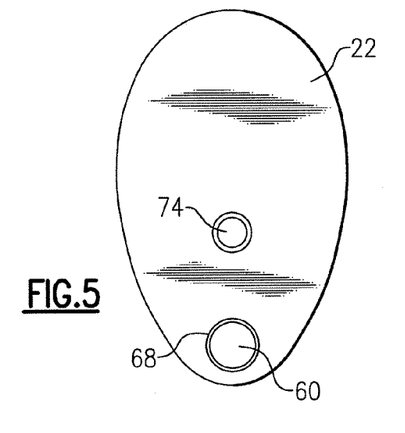
FIG. 5 is a top elevational view of the first embodiment.

When the lid 22 is threadably engaged with the reservoir 14 in the full closed position, as depicted in FIG. 1 and FIG. 2, the lid-section handle storage channel 68 aligns with both the upper section storage channel 66 and the lower section storage channel 64, so that the telescoping handle 60, when in storage position, fits and stores neatly within the dimensions of the container 12, within the three sections of the handle storage chambers, 64, 66, and 68. Referring to FIG. 3 and FIG. 4, in this preferred embodiment, the handle 60 remains locked in storage position by means of internal threading 70 molded into the lower storage channel 64, into which the external threaded portion 72 of the telescoping handle 60 is mated. It may be that the handle 60 is secured into storage position by some other means than described here. In this preferred embodiment featuring the integrated handle storage area, when the handle 60 is in the storage position, it also acts to: (i) prevent rotation of the lid about the rotational axis of its threads; and/or (ii) damps relative vibration between the lid and the chamber. These actions help ensure that the lid 22 remains in full closed/sealed position when the device 10 is in transport configuration, to further safeguard against accidental loosening of the lid 22. Only when the handle 60 is removed fully from at least storage channel sections 64 and 66 can the lid 22 be threadably decoupled from the reservoir 14.

When the telescopic handle 60 is in storage position as depicted in FIG. 1 and FIG. 2, the handle 60 doubles as a carry handle for the device 10, allowing a hand to fit around the exposed portion of the handle 60, the fingers fitting between the handle 60 and the container 12 through the open space created by design of the cut-out portion of the container 12.

To use the device 10, the user would reconfigure the device 10 for use from the stowed/transportable configuration as viewed in FIG. 1 and FIG. 2 to the operational configuration as viewed in FIG. 14. The user would first set the device 10 on a relatively flat surface so that the lid 22 is facing upwards, and then grasp the handle 60 from within its storage position within the integrated handle storage area 62 (where it doubles as the carrying handle), and turn the handle 60 counterclockwise to disengage the external threaded portion 72 at the lower end of the telescoping handle 60 from the internal threading 70 molded into the lower storage channel 64, then slide the handle 60 upwards within the integrated handle storage area 62, along storage channels 66 and 68, until there is sufficient length of the handle 60 protruding from the top of the lid 22 to then grasp and lift the handle 60 at a point above the lid 22, until it is completely clear of the lid-section storage channel 68. The user can then mate the handle 60 to the lid 22 by threadably engaging the external threaded portion 72 of the telescoping handle 60 to the internally threaded handle receptacle 74 which is recessed into the lid 22. The location of this recessed handle receptacle 74 on the lid 22 coincides with the location of the shaft receiver sleeve 28c which extends from the underside of the lid 22, so that, when the handle 60 is mated with the lid 22, the shaft 28 and handle 60 together form a singular long axis 28b. Once mated to the lid 22, the user can extend the telescopic handle 60 and lock it into fully-extended operational position in accordance with means well-known in the art of telescoping handles. The user would then remove the lid 22 from the container 12 by turning the lid 22 counterclockwise until the internal threading 24 within the lid 22 is disengaged from the external threading 20 at the top of the container 12, at which point the user can then lift the squeegee assembly 30 from its stowed position within the chamber 16 by grasping the handle 60 and lifting upwards. Once the squeegee assembly 30 clears the open end 18 of the container, the user can then rotate the squeegee head 30 from its stowed position in which the long axis 30a of the squeegee head assembly 30 is generally parallel to the long axis 28a of the shaft 28, to the operational position wherein the long axes 28a, 30a are generally orthogonal to each other. The device 10 is then ready for use.

Figure 10:
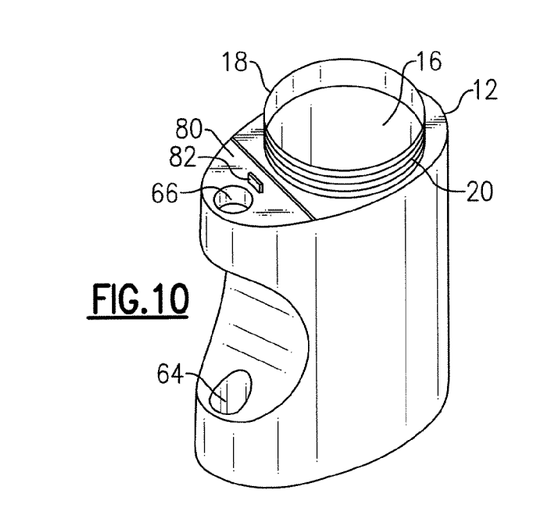
FIG. 10 is a perspective view of the first embodiment showing the removable cleaner tablet storage tray in the stowed position within the container; in this drawing, the container is depicted as being non-transparent in finish.
Figure 11:
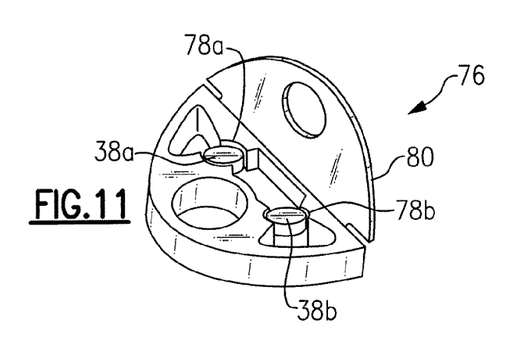
FIG. 11 is a perspective view of the first embodiment showing the removable cleaner tablet storage tray when removed from the stowed position within the container, and with the hinged lid of the tray in the open position.

The device 10 may be used in conjunction with instant glass cleaner tablets which dissolve in plain water within the chamber 16 to make an aqueous cleaning solution. These cleaner tablets are commercially available. As best seen in FIG. 9, FIG. 10, and FIG. 11, the device 10 features a removable cleaner tablet tray 76 with integrated tablet storage chambers 78a and 78b which can hold a supply of cleaner tablets. In this preferred embodiment, the removable cleaner tablet tray 76 has an integrated tray lid 80 which is hinged along the edge 80*a*. The tray lid 80 serves to protect the tablets from liquid when the container lid 22 is removed and/or the squeegee is in use. FIG. 11 shows the cleaner tablet tray 76 as removed from the cleaner tablet tray storage position within the container 12, with the tablet tray lid 80 open, and with cleaner tablets 38*a* and 38*b* stored, one each, in each of the two tablet chambers 78*a* and 78*b*. To access a cleaner tablet, the user would lift the cleaner tablet tray 76 out of the storage position within the container 12 via a small lift tab 82 on the tray lid 80, and then open the tray lid 80 by pulling on the lift tab 82 with sufficient force, and then lift and remove a cleaner tablet 38*a* or 38*b* out of either of the respective tablet chambers, 78*a* or 78*b*. The tablet can then be dropped into plain water within the reservoir chamber 16, where it will dissolve to create a cleaning solution. It may be that the tray lid 80 is opened by some other means than described here, such as gently squeezing the sided of the tray. Tablet storage may be provided through hardware other than a tray. Not all embodiments of the present invention will necessarily have tablet storage, but it is a preferred feature.

Some features of station 10 will now be discussed. As shown in FIGS. 12, 13 and 14, the squeegee features an integrated scraper blade at one end of the squeegee head assembly. The squeegee station is portable, so as to be used in any vehicle, dwelling, or other desired location, unlike the DeHart squeegee station which is permanently fixed. While some embodiments of the present invention may be mounted permanently to a moving vehicle, or even a service station fixture, many preferred embodiments of the present invention can be easily carried by hand from one location to another (and also stored easily in a vehicle for transportation wherever the vehicle is driven). Squeegee station 10 is such that the cleaning solution in the reservoir cannot come into contact with the handle (the upper handle, which is gripped when using the squeegee) when in storage configuration. Squeegee station 10 includes an integrated compartment for the storage of the cleaner tablets, giving an "on board" supply of cleaning solution. Squeegee station 10 features a telescoping handle, thereby allowing one or more of the following: (i) compact storage; and/or (ii) versatility in using the squeegee with either the shorter length or extended length handle configuration. Squeegee station 10 is much more compact in storage configuration than many, or all, prior art squeegee stations. The used cleaning solution in squeegee station 10 can be dumped easily, without the user coming into contact with the used cleaning solution, whereas with some, or all prior art squeegee stations the water is drained via a drain tube and plug at the bottom of the reservoir canister.

Squeegee station 10 has an integrated "hand guard" (by virtue of the canister lid affixed to the squeegee handle), which prevents any cleaning solution from running down the handle and onto the hand. The lid of the container of squeegee station 10 serves as a disc-shaped hand protector which is intended reduce or eliminate the problem of stray water from the squeegee head ending up on the user's body. The hand guard provided by the lid of squeegee station 10 has a lip, which fully catches any cleaning solution which runs down the handle from the squeegee head.

In squeegee station 10, the squeegee head is locked in either the cleaning or storage positions by means of points which correspond in both positions, between the leg 40 and the shaft 28 which is interposed in the channel 38, so that, once a certain resistance is overcome, the squeegee head will fold from one position to the other.

Figure 17:
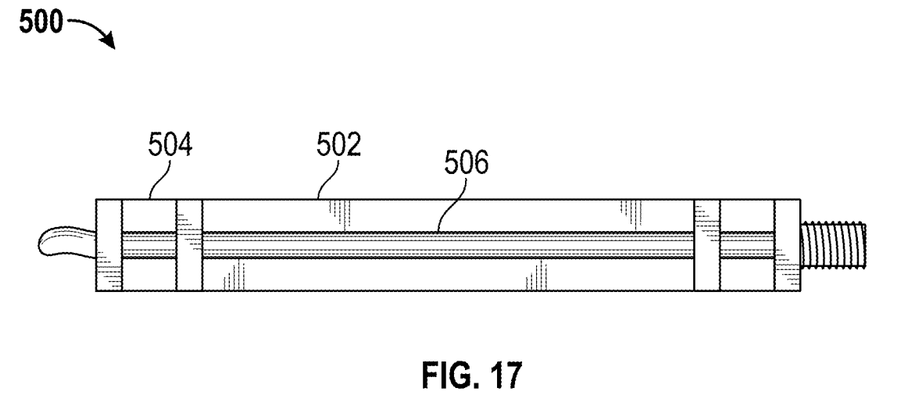
FIG. 17 is an orthographic top view of a second embodiment of a portable cleaning station according to the present invention.
Figure 18:
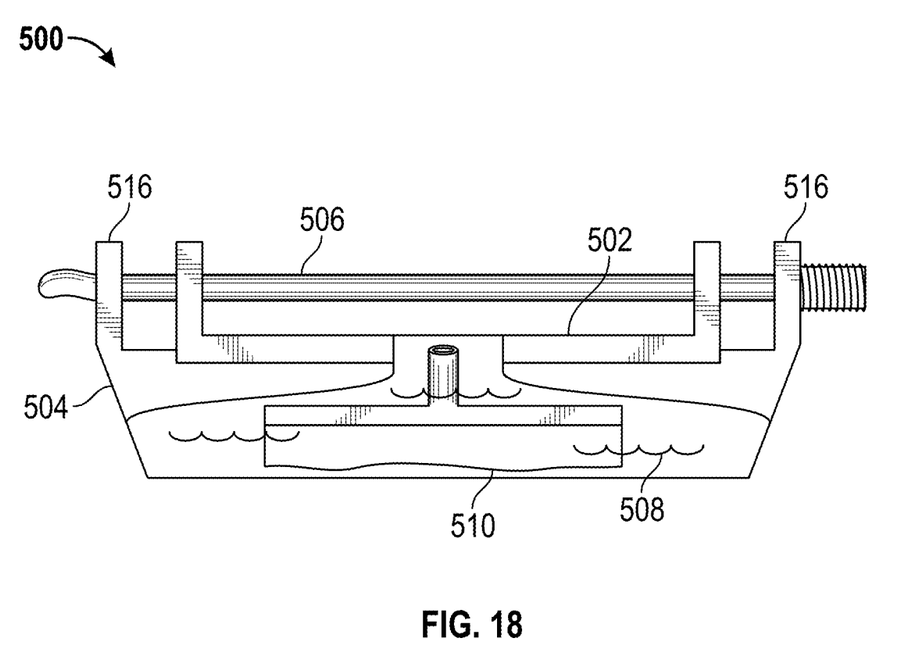
FIG. 18 is a partially cut-away orthographic front view of the second embodiment cleaning station.
Figure 19:
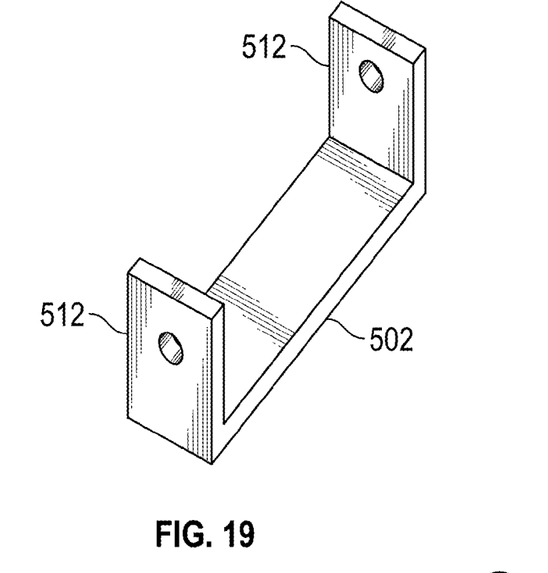
FIG. 19 is a perspective view of a portion of the second embodiment cleaning station.
Figure 20:
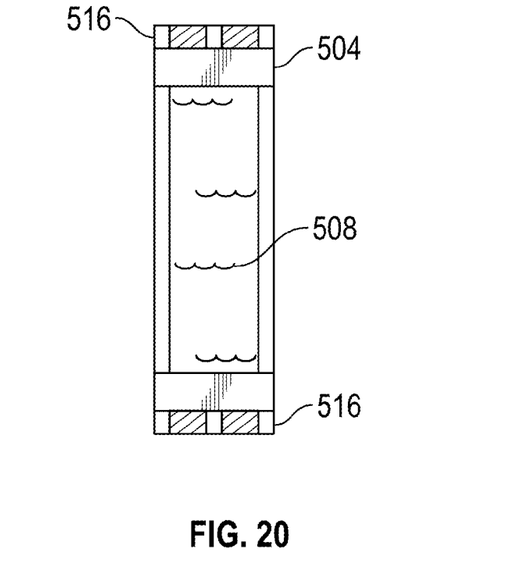
FIG. 20 is an orthographic top view of the second embodiment station.
Figure 21:
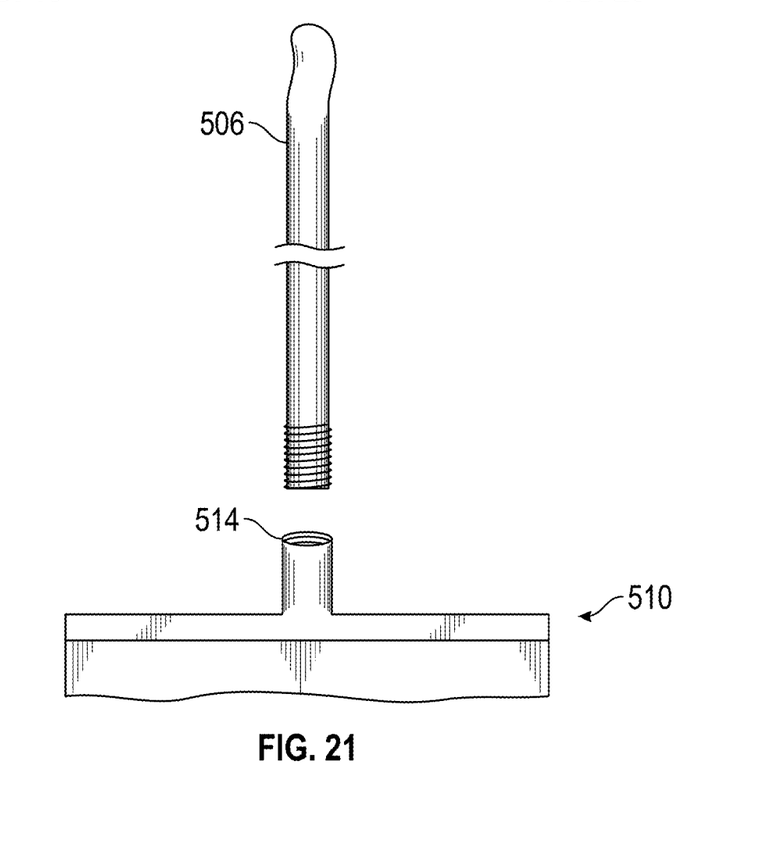
FIG. 21 is an exploded view of a portion of the second embodiment station.
Figure 22:
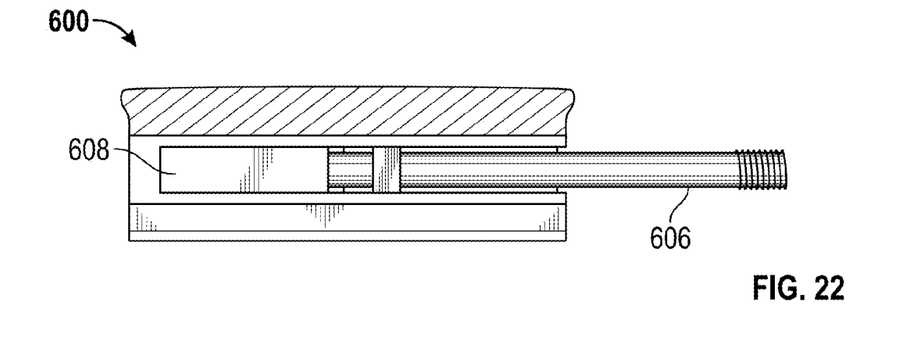
FIG. 22 shows an orthogonal rear view (in storage position) of an embodiment of a squeegee according to the present invention.

Some embodiments of the present invention, like squeegee station 10, have a pivoting squeegee head. Generally speaking, this makes for a relatively tall and narrow squeegee station. Other embodiments, like the embodiment of FIG. 17 et seq. to be discussed below, do not have a pivoting head, which makes for a relatively wide and short squeegee station.

A feature of squeegee station 10 is that the user can move the squeegee head from storage (parallel) to operational (perpendicular) positions without the user needing to touch the wet squeegee head. This is why, initially, the design is such that there is no latch which the user would flip or otherwise maneuver. In some preferred embodiments according to the present invention there will be hardware for locking the head into operational position other than one which can be overcome by resistance, since that scraping action provides much resistance already. For example, one way in which the head may be unlocked is by the user pushing straight down on the top of the squeegee handle (as if it's an inverted T, with the squeegee head sitting on the ground), which would release a firm (not overcome by side to side resistance) locking mechanism of some sort, and then the squeegee head can be rotated into storage position (which would feature the resistance locking mechanism).

Figure 6:
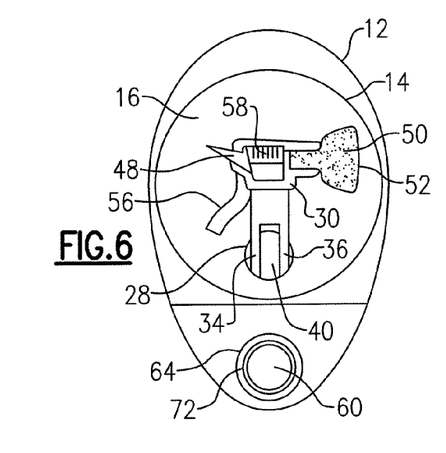
FIG. 6 is a bottom elevational view the first embodiment.
Figure 7:
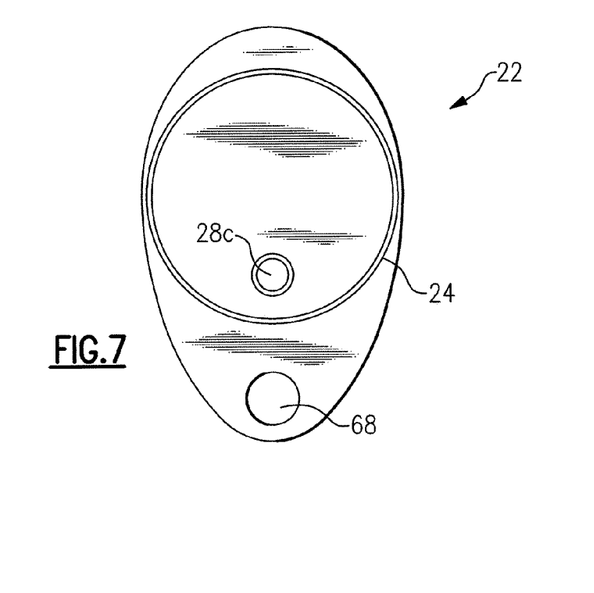
FIG. 7 is a bottom elevational view of a lid portion of the first embodiment.

Some advantageous features of station 10 will now be discussed. One feature, as shown in FIGS. 4 and 6, is that the interior space of the container lies entirely within the vertical footprint (see DEFINITIONS section) of the top opening of the container. This is highly preferred for station embodiments of the present invention that have a squeegee with a pivoting head, and especially a squeegee with a pivoting head where the pivot point is offset from the body of the squeegee head (see FIG. 13). The reason that this is so preferred is that when the top opening overhangs the interior space of the container (see Verlin at FIGS. 2 and 3 for examples of such overhang), then the squeegee head can catch on the inside of the container as it is being pulled out, resulting in user frustration, wear on the pivoting hardware of the squeegee and perhaps even component failure. Verlin apparently attempts to solve the problem created by its overhang by the use of an internal guide with apertures. However, this internal guide is potentially problematic for reasons noted above and the solution of the present invention, wherein the interior space of the container lies completely within the vertical footprint of the top opening is better.

Figure 8:
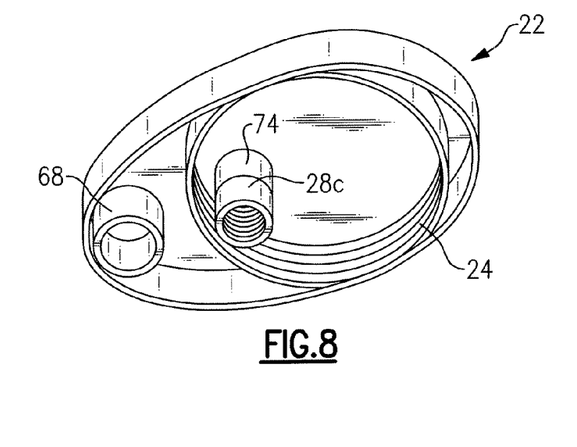
FIG. 8 is a perspective view of the lid, looking up from below the lid.

As shown in FIGS. 2 and 8, the lower portion of the squeegee attaches to the underside of the threaded lid at a location offset from the axis of rotation defined by the threads (referring to the threads that engage with the top opening of the container here, not the threads that connect the underside of the lid to the lower squeegee handle segment). The fact that the interior space of the container lies completely in the vertical footprint of the top opening helps make this possible because the elimination of any overhand eliminates the possibility that the squeegee head will catch on the inside of the container, even when the lower portion of the squeegee hangs quite close to an upstanding peripheral wall of the container and away from the center of the lid and the interior space. As shown in FIG. 2, this offset placement of the attachment between the underside of the lid and the lower part of the squeegee also makes it easier to accommodate squeegees that have a pivoting head where there is an offset between the squeegee head and its pivot point. As shown in FIG. 2, the sponge and blade are located proximate to the central axis of the interior space of the container and well away from the (potentially dirty) interior walls of the container.

In the embodiment 10, the squeegee head, or part of the squeegee head may be considered consumable and replaceable. For example, the blade, sponge and part of the frame may form a disposable assembly. As a further example, the lid, lower handle, connection hardware, entire head frame, blade and sponge may form a single part, disposable subassembly. There are many possibilities with respect to modular, partially disposable squeegee design.

One final note about embodiment 10 relates to the alignment of the respective squeegee handle segments over and under the lid. As shown in FIG. 14, these segments are coaxially aligned, and both are perpendicular to the major surfaces of the lid, which is a preferred design. However, these handle segments do not necessarily always need to be coaxially aligned, which is to say that their locations within the vertical footprint of the lid could be offset. Also, one or both handle segments could form an acute angle with the lid, rather than being perpendicular. While a perpendicular alignment may provide maximum reach, an angled, or curved squeegee handle may provide better leverage when cleaning.

While the particular embodiment 10 as herein shown and described is considered to be inventive, useful and advantageous in many aspects, it is to be understood that it is the presently preferred embodiment of the present invention and is thus representative of the subject matter which is broadly contemplated by the present invention, and that the scope of the present invention fully encompasses other embodiments which may become obvious to those skilled in the art. The invention should therefore not be limited by the above-described embodiment which is but one embodiment to describe the scope and spirit of the invention.

FIGS. 17 to 21 show a portable cleaning station including the following: lid 502 (including two lugs 512); chamber 504 (including two lugs 516); cleaning fluid 508; squeegee handle 506; squeegee head 510 and threaded hole 514.

In the storage configuration (see FIGS. 17 and 18): (i) squeegee handle is threaded through coaxial lugs 512 (in the lid) and 516 (in the chamber); (iii) the squeegee handle serves to help secure the lid in place (preferably, but not necessarily, in a fluid tight manner); (iv) the squeegee handle also serves as a handle that help a user carry the station; (v) the squeegee head piece is not attached to the lid and is unsecured within the interior space of the container; and (vi) the handle is not secured, except by a friction fit, against motion in along the direction of its own central axis.

In the cleaning operations configuration (see FIGS. 19 to 21): (i) the handle is removed from the coaxial holes in the lugs; (ii) the lid is removed from the chamber, thereby allowing access to the squeegee head; and (iii) the handle is screwed into the threaded hole at the base of the squeegee head. It is noted that in this embodiment the top opening is long and narrow, much like the opening of non-portable squeegee stations located at service stations.

Figure 23:
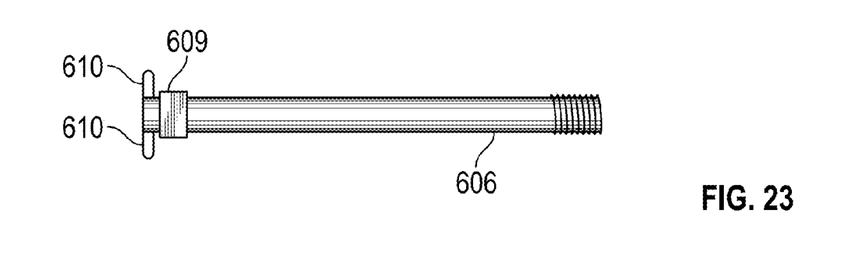
FIG. 23 shows an orthogonal front view of a portion of the squeegee of FIG. 22.
Figure 24:
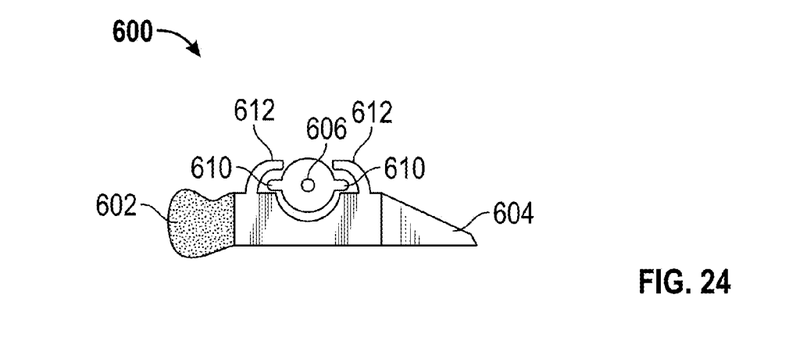
FIG. 24 shows an orthogonal side view of the FIG. 22 squeegee.
Figure 25:
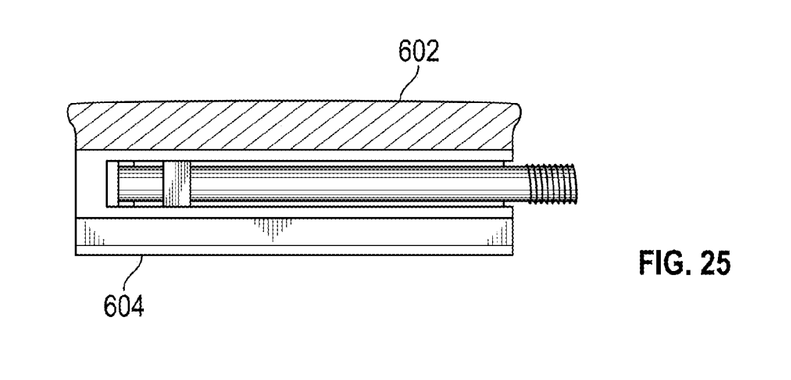
FIG. 25 shows another orthogonal rear view (in between storage position and cleaning position) of the FIG. 22 squeegee.

FIGS. 22 to 25 show squeegee 600, may be inventive in conjunction with the squeegee stations described above. Squeegee 600 includes: sponge 602; blade 604; handle 606; slide channel 608; pivoting hardware set 609; wings 610; and channel sides 612. As shown in FIGS. 23 and 24, the wings serve as guides that slide in the channel. Unlike the squeegee of Verlin, the end of handle of squeegee 600 not only pivots with respect to the squeegee head, but also translates along its central axis relative to the squeegee head. This can be helpful for compacting the squeegee into an even smaller space for storage (for example, storage in a squeegee station or longer squeegee in a given space). Preferably, pivoting hardware set 609 would also include dual position locking hardware (not shown) so that the handle will relatively secured in both storage position (zero degrees relative to the head) and cleaning position (at angle, preferably 90 degrees, relative to the head). Alternatively, the hinge and/or male portion of the guides could be located on the head, rather than the handle, or the guides and/or handle could be located on an intermediate component, detachably attachable to and from both the handle and the head. As a further alternative, the pivot point for the pivoting action between the handle and head could be offset from the body of the squeegee head (see FIG. 13).

DEFINITIONS

Any and all published documents mentioned herein shall be considered to be incorporated by reference, in their respective entireties, herein to the fullest extent of the patent law. The following definitions are provided for claim construction purposes:

Present invention: means at least some embodiments of the present invention; references to various feature(s) of the "present invention" throughout this document do not mean that all claimed embodiments or methods include the referenced feature(s).

Embodiment: a machine, manufacture, system, method, process and/or composition that may (not must) meet the embodiment of a present, past or future patent claim based on this patent document; for example, an "embodiment" might not be covered by any claims filed with this patent document, but described as an "embodiment" to show the scope of the invention and indicate that it might (or might not) be covered in a later arising claim (for example, an amended claim, a continuation application claim, a divisional application claim, a reissue application claim, a re-examination proceeding claim, an interference count); also, an embodiment that is indeed covered by claims filed with this patent document might cease to be covered by claim amendments made during prosecution.

First, second, third, etc. ("ordinals"): Unless otherwise noted, ordinals only serve to distinguish or identify (e.g., various members of a group); the mere use of ordinals shall not be taken to necessarily imply order (for example, time order, space order).

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

lies in the vertical footprint: a given volume "lies in the vertical footprint" of a given area if the footprint of the volume, taken in the horizontal plane, lies completely within the given area.

recess: recess or hole.

cleaning fluid: includes cleaning fluids in the form of aqueous liquids, colloidal suspensions, plain old water and/or non-aqueous liquids.

rubber: any flexible material (now known or to be developed in the future) suitable for forming a squeegee blade.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control.

What is claimed is:

1. A portable squeegee station comprising:
   a container having a continuous side wall located between a top end and a bottom end opposite the top end;
   a fluid reservoir, located within an interior portion of the container, for storing a cleaning solution;
   a lid, having an upper surface and a lower surface, threadably engaged with the top end of the container;
   an inwardly curved opening located in the side wall forming an integrated handle storage area, the integrated handle storage area comprising:
      a lower section storage channel extending perpendicularly upwards from the bottom end of the container to a bottom portion of the inwardly curved opening;
      an upper section storage channel extending perpendicularly downwards from the top end of the container to a top portion of the inwardly curved opening; and
      a lid-section handle storage channel extending perpendicularly downwards from the lower surface of the lid;
   a shaft having a first shaft end and a second shaft end where the first shaft end is threadably engaged to, and extending perpendicularly from, the lower surface of the lid; and
   a squeegee assembly pivotably connected to the second shaft end.

2. The portable squeegee station of claim 1 further comprising:
   a removable telescoping handle for storage in the integrated handle storage area, the removable telescoping handle having a first end for engagement with the upper section storage channel and a second end for engagement with the lower section storage channel.

3. The portable squeegee station of claim 2 further comprising an internally threaded handle receptacle recessed into the lid and adapted to receive either the first end or the second end of the telescoping handle.

4. The portable squeegee station of claim 1 wherein the squeegee assembly comprises:
   a squeegee head frame, having a top side and a bottom side opposite the top side, defining opposed first and second channels;
   an elongated rubber blade removably held within the first channel;
   a sponge portion removably held within the second channel; and
   a handle segment.

5. The portable squeegee station of claim 4 wherein the sponge portion is covered by an abrasive cloth layer.

6. The portable squeegee station of claim 4 wherein the squeegee head frame includes a plurality of cut-out sections extending from the top side of the squeegee head frame through to the bottom side of the squeegee head frame.

7. The portable squeegee station of claim 6 wherein the plurality of cut-out sections are sized and shaped to reduce the amount of fluid displaced by the squeegee head frame when submerged in the fluid reservoir.

8. The portable squeegee station of claim 4 wherein the handle segment is rotatable between a cleaning position and a storage position, wherein the head frame is perpendicular to the shaft when in the cleaning position, and wherein head frame is parallel to the shaft when in the storage position.

9. The portable squeegee station of claim 8 wherein the squeegee assembly further comprises a pull ring extending perpendicularly outward from the top side of the squeegee head frame.

10. The portable squeegee station of claim 4 wherein the elongated rubber blade is shaped and/or sized to be suitable for use in cleaning motor vehicle windows.

11. The portable squeegee station of claim 4 wherein the squeegee assembly further comprises a scraper blade extending perpendicularly outward from one end of the squeegee head frame.

12. The portable squeegee station of claim 1 further comprising:
   a tray detachably connected to the top surface of the container.

13. The portable squeegee station of claim 12 wherein the tray includes a plurality of storage chambers.

14. The portable squeegee station of claim 12 further comprising:
   a tray lid hingedly connected to the tray; and
   a lift tab extending outwardly from the tray lid and adapted for lifting the tray lid from the tray by pulling upwards.

15. The portable squeegee station of claim 14 wherein the squeegee assembly is located in the fluid reservoir when in a stowed position.

* * * * *